(12) United States Patent
Friedman

(10) Patent No.: US 10,071,658 B2
(45) Date of Patent: Sep. 11, 2018

(54) DISENGAGABLE HEAD RESTRAINT APPARATUS

(71) Applicant: Diana M. Friedman, Evanston, IL (US)

(72) Inventor: Diana M. Friedman, Evanston, IL (US)

( * ) Notice: Subject to any disclaimer, the term of this patent is extended or adjusted under 35 U.S.C. 154(b) by 0 days.

(21) Appl. No.: 15/187,292

(22) Filed: Jun. 20, 2016

(65) Prior Publication Data

US 2016/0297331 A1    Oct. 13, 2016

Related U.S. Application Data

(63) Continuation-in-part of application No. 14/679,298, filed on Apr. 6, 2015, now Pat. No. 9,371,018.

(60) Provisional application No. 61/975,299, filed on Apr. 4, 2014.

(51) Int. Cl.
*A47C 7/38* (2006.01)
*B60N 2/28* (2006.01)
*B60N 2/882* (2018.01)

(52) U.S. Cl.
CPC .............. *B60N 2/2851* (2013.01); *A47C 7/38* (2013.01); *B60N 2/882* (2018.02)

(58) Field of Classification Search
CPC ................................ B60N 2/4879; A47C 7/38
USPC .......................................... 297/393, 397, 464
See application file for complete search history.

(56) References Cited

U.S. PATENT DOCUMENTS

| | | |
|---|---|---|
| 4,707,031 A | 11/1987 | Meistrell |
| 5,378,042 A | 1/1995 | Daneshvar |
| 5,395,158 A | 3/1995 | Cordia |
| 6,266,825 B1 | 7/2001 | Floyd |
| 6,301,716 B1 | 10/2001 | Ross |
| 6,607,245 B1 | 8/2003 | Scher |
| 7,628,456 B1 | 12/2009 | Swartz |
| 7,740,318 B2 | 6/2010 | Funke et al. |
| 7,832,802 B2 | 11/2010 | Ehlers et al. |
| 8,191,969 B2 | 6/2012 | Demaras |
| 8,287,045 B1 | 10/2012 | Donohue et al. |
| 8,381,316 B2 | 2/2013 | Edwards |
| 8,662,590 B2 | 3/2014 | Bogen |
| 8,726,419 B2 | 5/2014 | Vahley |
| 8,820,838 B1 | 9/2014 | Palmer |
| 8,834,394 B2 | 9/2014 | Ghajar |
| 8,967,720 B2 | 3/2015 | Davis |
| 2002/0067063 A1 | 6/2002 | Taborro |
| 2004/0124685 A1 | 7/2004 | Buch |
| 2011/0043025 A1 | 2/2011 | Park |
| 2013/0020853 A1 | 1/2013 | Gibson |
| 2014/0145487 A1 | 5/2014 | Donohue et al. |
| 2015/0042143 A1 | 2/2015 | Maginness |
| 2015/0298589 A1 | 10/2015 | Zaouk et al. |

*Primary Examiner* — Timothy J Brindley
(74) *Attorney, Agent, or Firm* — Burns & Levinson LLP; Bruce D. Jobse, Esq.

(57) ABSTRACT

An accessory device that gently restrains a child's forehead to prevent his or her head from bobbing when asleep in a car seat includes head retention piece with outwardly extending center and side bands for securing the accessory device about the child car seat. In the event of a sudden change in momentum, the device slides off the top of the child's head do to one of the bands being less elastic than the others.

15 Claims, 7 Drawing Sheets

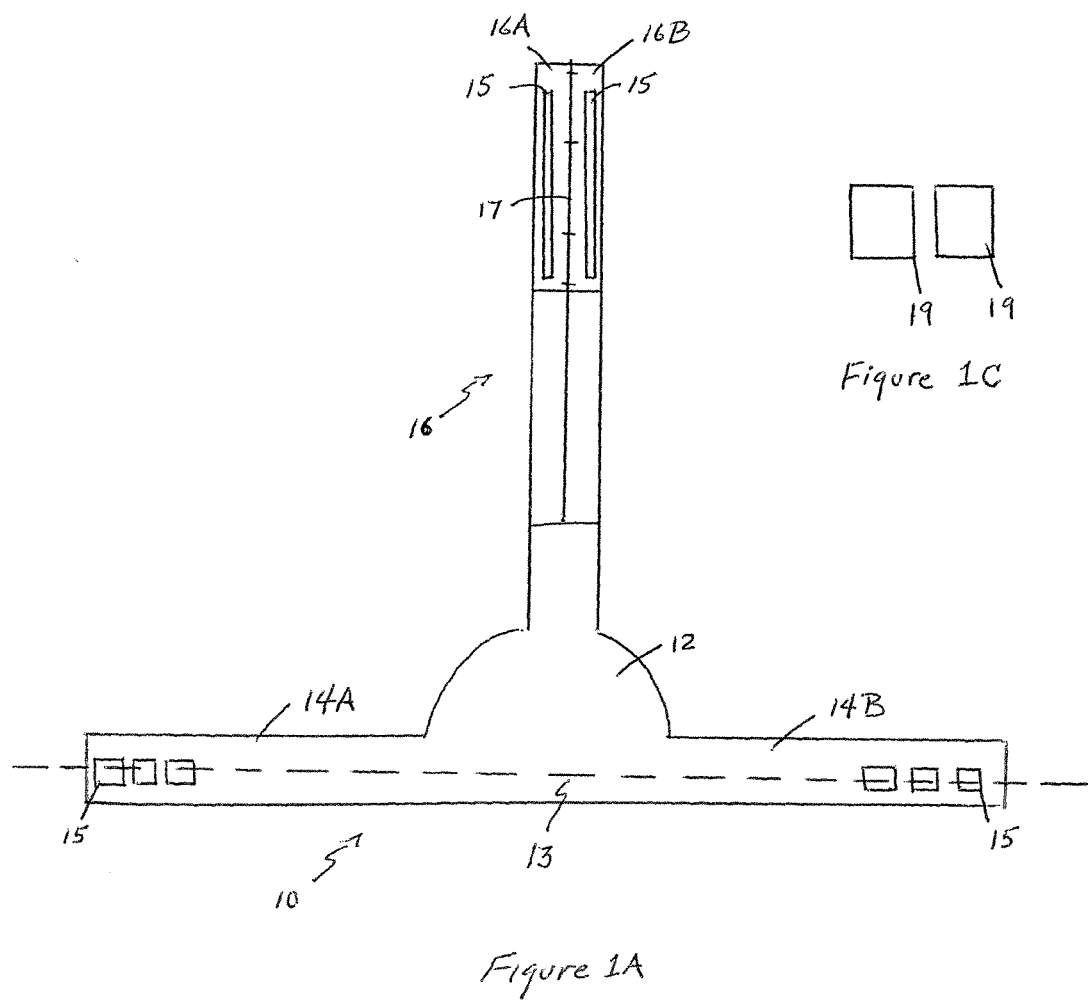

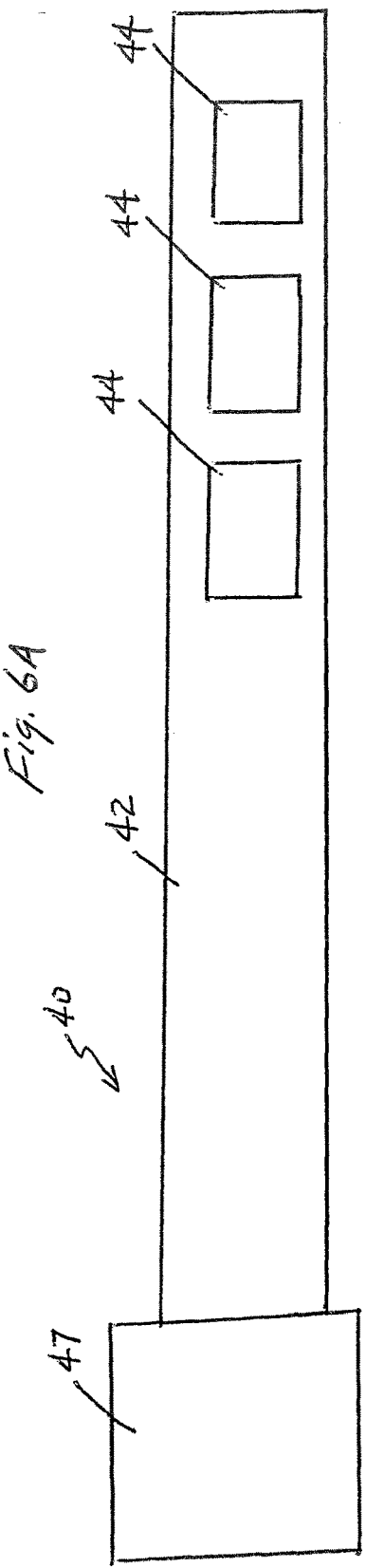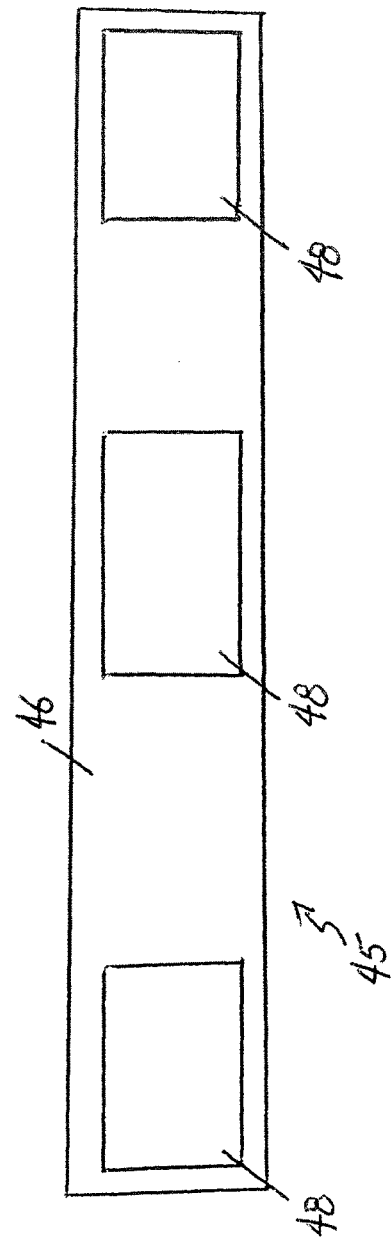

DISENGAGABLE HEAD RESTRAINT APPARATUS

FIELD OF THE INVENTION

Figure 2B:
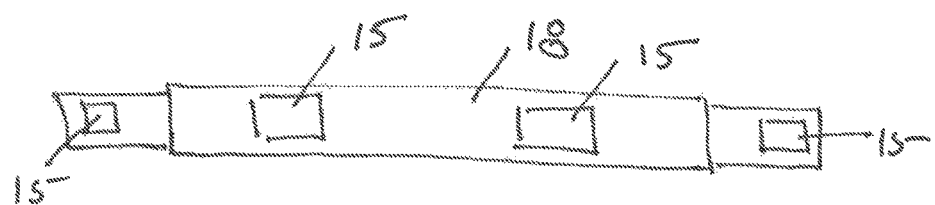

The disclosure relates to child comfort and safety, and, more particularly to a forehead restraint accessory for use with child car seats.

BACKGROUND OF THE INVENTION

When children an fall asleep in an upright seated position, particularly children while sitting in a car safety seat, their heads tend to bob forward or to the side. Such positions are uncomfortable and can often lead to frequent sleep interruption and sore muscles, particularly in the neck, shoulders and head. Accordingly, need exists for an apparatus or device which may be used with commercially available child car seats which will prevent the child's head and neck from gravitating to one or more uncomfortable positions when the child is asleep within the car seat.

SUMMARY OF THE INVENTION

Disclosed is an accessory device, herein referred to as the "bobstop", for use in conjunction with child car seats that gently restrains a child's forehead to prevent his or her head from bobbing when asleep in a car seat. According to one aspect of the disclosure, the accessory device comprises a head retention piece and means for securing the head retention piece securely to the child car seat. In one embodiment, the accessory device comprises a head retention piece with side bands and a center back band, which are selectively engageable and disengageable to form a loop, with a center band extending between and securable to the head retention piece and a back band. The back band is securable to the child car seat to retain the accessory securely thereto. The front head retention piece rests adjacent the child's forehead and may optionally be decorated with a graphic or fabric which is aesthetically pleasing or inviting to the child occupant of the car seat.

According to one aspect of the disclosure, ahead restraint apparatus for use with car seats comprises: a head retention piece; a pair of side bands extending outward from the head retention piece in opposite directions along a common axis; and a center band extending outward from the head retention piece in a direction substantially normal to the common axis, wherein the side bands and center band are securable together about a car seat. In one embodiment, the apparatus further comprises a back band securable to one of the side bands and center band. In other embodiments, the back band is securable to the side bands and center band. In other embodiments, the center band is implemented with a pair of bands secured to each other at plural locations along respective lengths thereof so that adjacent locations at which the pair of bands are secured together define a slit allowing passage of an object, such as a car seat tether or safety belt, through the center band.

According to another aspect of the disclosure, a kit comprises: a head restraint apparatus for use with car seats comprising a head retention piece having a pair of side bands extending outward therefrom along a common axis and a center band extending outward from the head retention piece in a direction substantially normal to the common axis; a back band securable to the side bands and center band; one or more securing means for securing any of the side bands, center band, or back band to the car seat.

According to still another aspect of the disclosure, method for securing a head restraint apparatus to a car seat, the method comprises: providing a head restraint apparatus comprising a head retention piece having a pair of side bands extending outward therefrom along a common axis and a center band extending outward from the head retention piece in a direction substantially normal to the common axis; removably securing the side bands about sides of a car seat with a back band; removably securing the center band about a top of the car seat with a back band; and removably securing the back band to the car seat.

Further disclosed herein is an accessory device, that gently restrains a child's forehead to prevent his or her head from bobbing when asleep in a car seat but which disengages by easily sliding over the top of the child's head in the event of a sudden change in momentum. In one embodiment, the accessory device may be provided with multiple straps, at least one of which has different elasticity than the other straps, thereby enabling the accessory device to slip off the child's head. More specifically, if the center band, or extension strap thereof, connected to the center of the head retention piece is stiffer or less elastic than one or both of side bands, in the event of a vehicle impact, as the child's head moves forward, the stiffer less elastic center band will stretch less causing the head retention piece to slide over the top of the child's head as the child's head moves forward in response to a sudden change in momentum. In another embodiment, one or more of the side bands are attached to a back band which secures the accessory device around a car seat, the combination of side bands and back bands being a more elastic than either the center band or the combination of the center band is attached to the back band.

According to one aspect of the disclosure, ahead restraint apparatus for use with car seats comprises: a head retention piece; a pair of side bands extending outward from the head retention piece in opposite directions along a common axis; and a center band extending outward from the head retention piece in a direction substantially normal to the common axis, wherein the side bands and center band are securable about a car seat, and wherein the center band is less elastic than the side bands.

According to another aspect of the disclosure, a kit comprises: a head restraint apparatus for use with car seats comprising a head retention piece having a plurality of bands extending outward therefrom, at least one of the plurality of bands having a lower level of elasticity than others of the plurality of bands; and one or more securing means for securing any of the plurality of side bands, center band, or back band to the car seat.

According to still another aspect of the disclosure, a method for securing a head restraint apparatus to a car seat comprises: providing a head restraint apparatus comprising a head retention piece having a center band and plural side bands extending outward therefrom, at least one of the bands having a lower level of elasticity than others of the bands; removably securing the side bands about sides of a car seat; and removably securing the center band about a top of the car seat.

According to yet another aspect of the disclosure, an article of manufacture comprises a head retention piece having a plurality of bands extending outward therefrom, at least one of the plurality of bands having less elasticity than others of the plurality of bands.

DESCRIPTION THE DRAWINGS

Figure 2C:
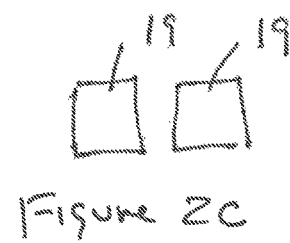
Figure 2A:
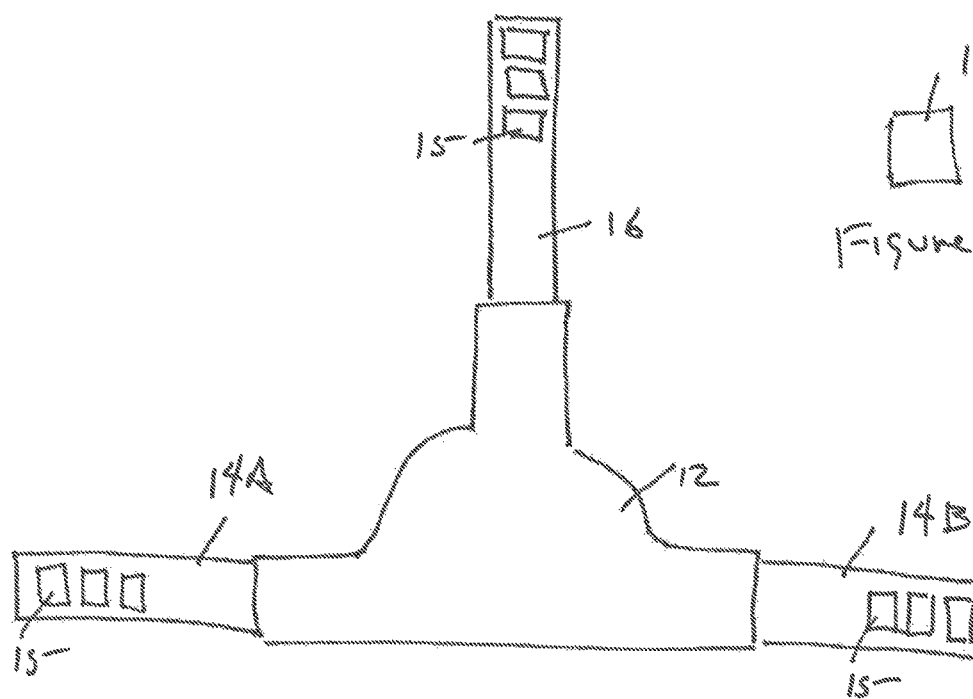
Figure 3B:
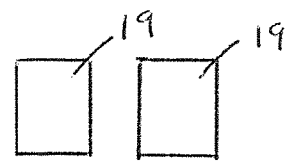
Figure 3A:
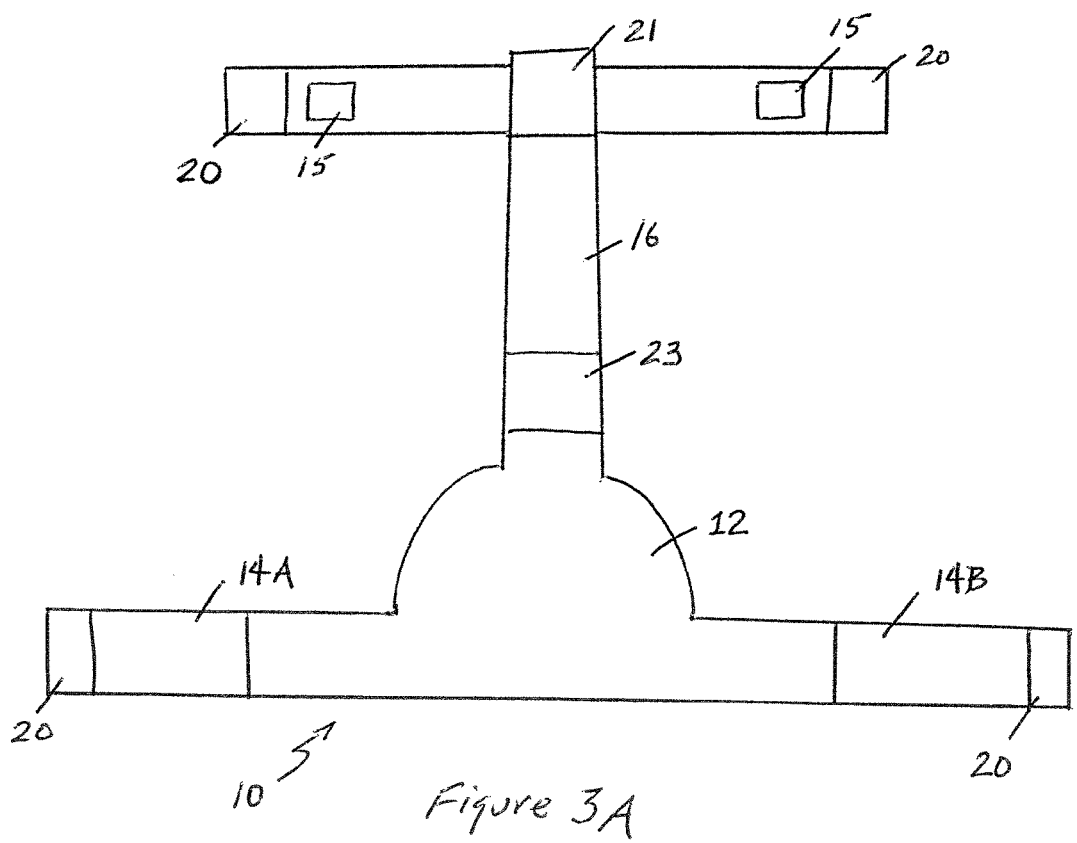
Figure 4A:
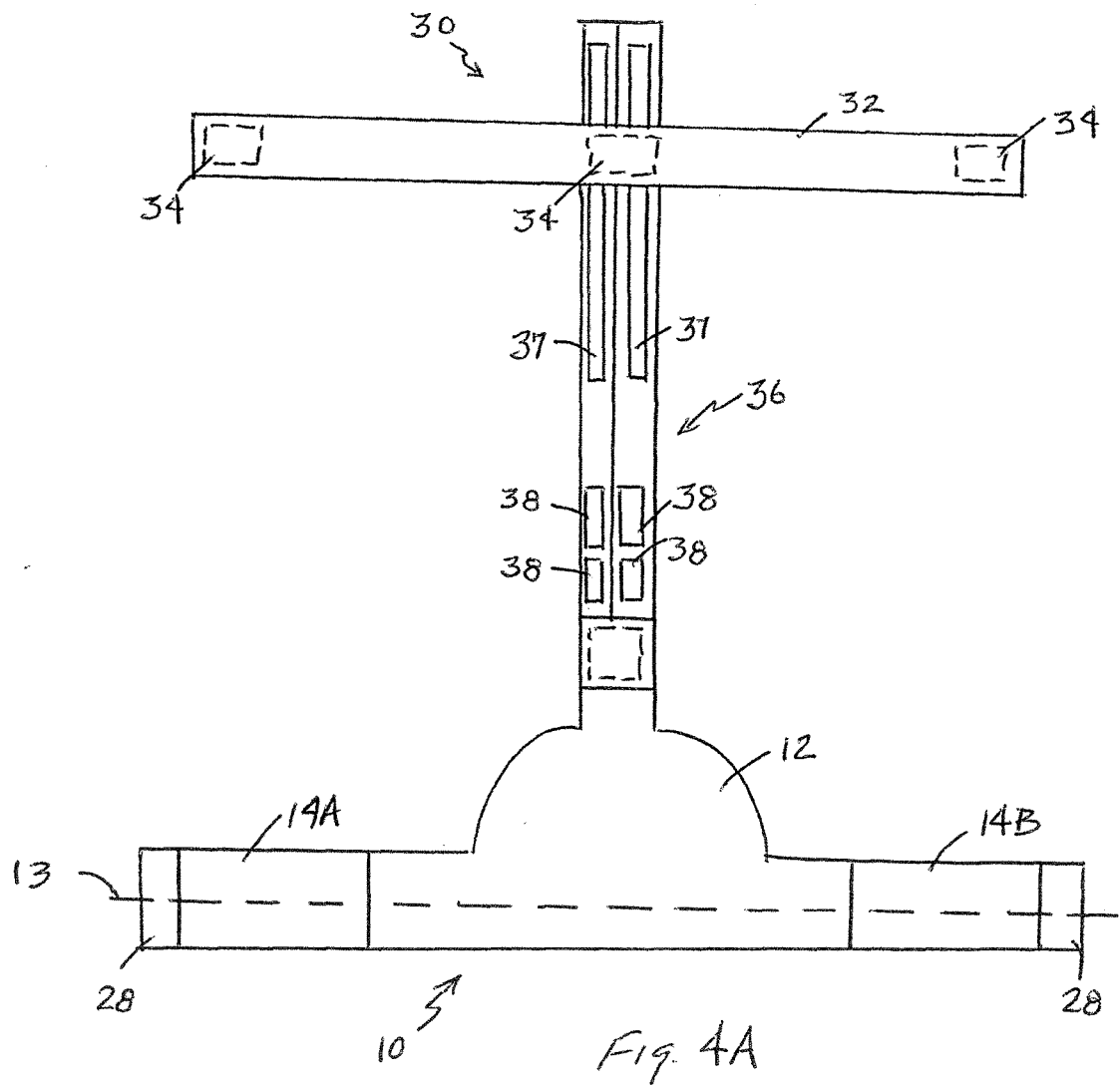
Figure 4B:
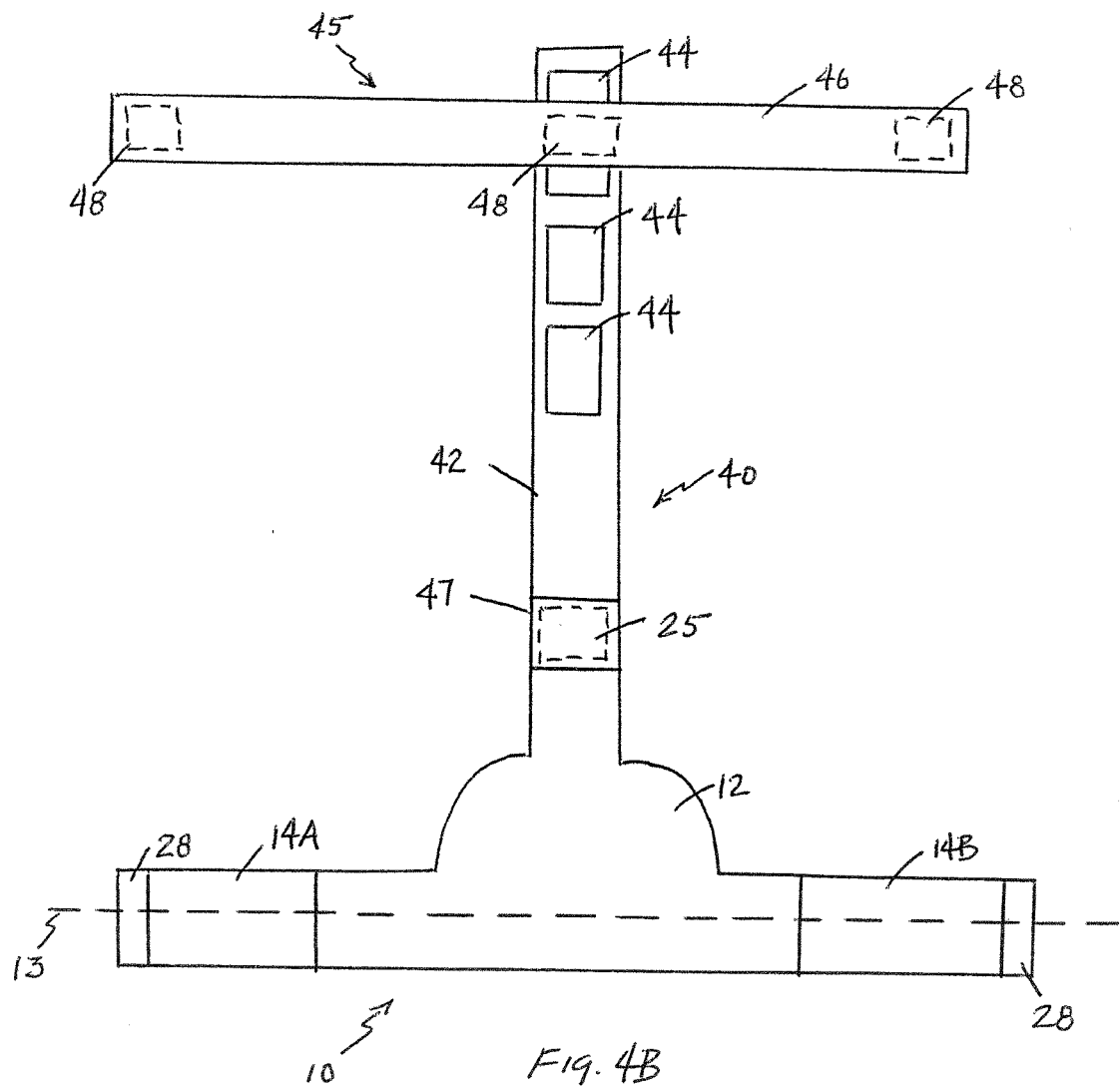
Figure 5B:
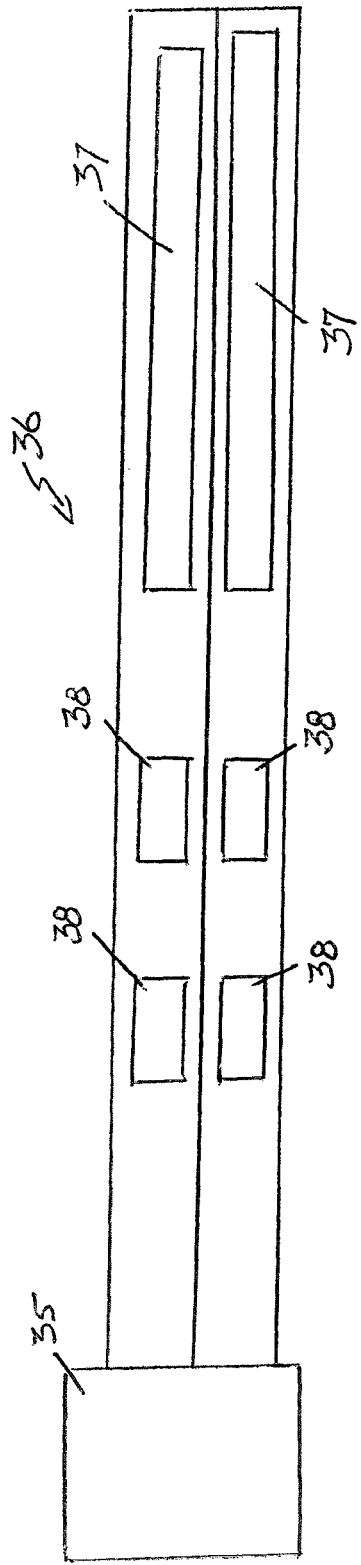
Figure 5A:
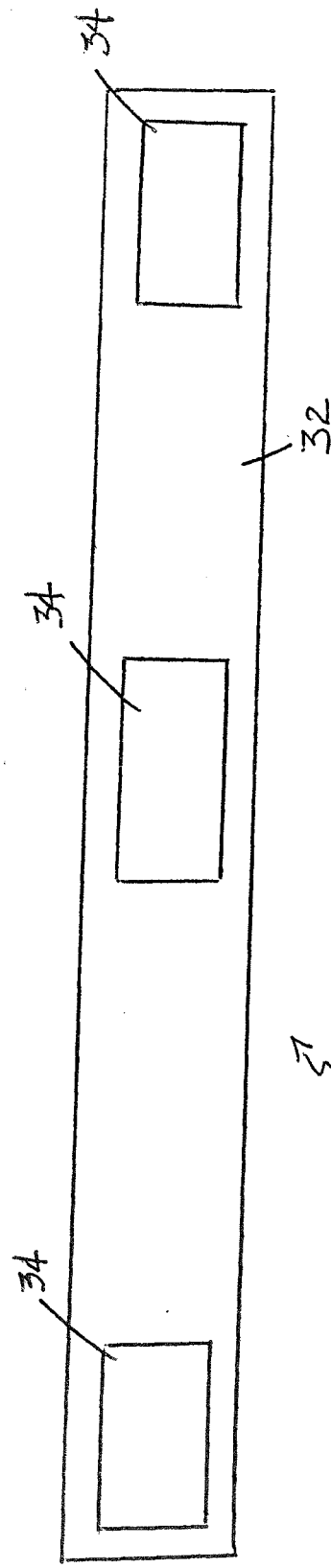

FIGS. 1A-C illustrate conceptually a rear plan view of an accessory device kit and component parts for securing to a child car seat in accordance with the disclosure;

FIGS. 2A-C illustrate conceptually a rear plan view of another accessory device kit and component parts for securing to a child car seat in accordance with the disclosure;

FIGS. 3A-B illustrate conceptually a rear plan view of another accessory device in accordance with the disclosure;

FIGS. 4A-B illustrates conceptually a rear plan views of an accessory device for securing the accessory device to a convertible car seat and booster seat, respectively, in accordance with the disclosure;

FIGS. 5A-B illustrate conceptually rear plan views of a back band and center band extension, respectively, used with the accessory device of FIG. 4A for securing the accessory device to a convertible car seat, in accordance with the disclosure; and FIGS. 6A-B illustrate conceptually rear plan views of a center band extension and back band, respectively, used with the accessory device of FIG. 4B for securing the accessory device to a booster seat, in accordance with the disclosure.

DETAILED DESCRIPTION

The BobStop is an accessory device that gently restrains a child's forehead to prevent his or her head from bobbing and rolling when the child falls asleep in the car seat. In one embodiment, the accessory device 10 comprises a head retention piece 12 having a pair of side bands 14A-B secured thereto and extending in opposite directions outwardly therefrom along a common axis 13, illustrated in phantom in FIG. 1, and a center band 16 extending outwardly from head retention piece 12 in a direction normal to an axis 13. Accessory device 10 further comprises a back band 18 securable to one or more of the side bands 14A-B and center band 16 for securing the accessory device 10 to a car seat.

The head retention piece 12 may be made of fabric and shaped to accommodate the curvature of the four head. In one embodiment, the head retention piece 12 may be made of fleece and/or lining materials which are soft and comfortable against the child's forehead and scalp. An animal face design or other graphic may adorn the headpiece to increase the attractiveness of the accessory device 10 to children and to reduce their resistance to using the device. In one embodiment, head retention piece 12 may have a generally triangular shape, as illustrated in FIG. 1, that extends at least partially from one side of the child car seat, across the child's forehead, to the other side of the child car seat.

Side bands 14A-B are either permanently or removably secured to head retention piece 12 and extend in opposite directions outwardly therefrom along a common axis 13, illustrated in phantom in FIG. 1A. Side bands 14A-B may be secured to head retention piece 12 by any of stitching, buckles, hook and pile connectors, snaps, etc., at one or both ends thereof. In one embodiment, the side bands may have male buckle projection counterparts or female Velcro secured at one or both ends thereof. Side bands 14A-B may be implemented with elastic, webbing or other durable fabric.

A center band 16 is connected to the center of the head retention piece 12 and extends outwardly therefrom along an axis substantially normal to an axis 13 over the top of the child's head to the back of the car seat where it attaches to the back band 18, as explained herein. The center band 16 prevents the child from accidentally pulling the head retention piece 12 over his or her face or neck. The center band 16, like side bands 14A-B may be implemented with elastic, webbing or other durable fabric. In one embodiment, the center band 16 may comprise a pair of bands 16A-B each having a first end sewn to head retention piece 12 and a second end securable to back band 18. In such embodiments, bands 16A-B comprising center band 16 are secured to each other, typically with stitching, at plural locations along respective lengths thereof so that adjacent locations at which the pair of bands are secured together define a slit 17 allowing passage of an object, such as a car seat tether or safety belt, through the center band 16. Bands 16A-B may have one of hook and pile sections of a hook and pile connector, such as Velcro, extending over a portion of their respective lengths to facilitate attachment of center band 16 to back band 18.

Note, as used herein the term "center band" may refer to that band which extends outward from head retention piece 12 normal to axis 13 and may be implemented similar to center band 16, or to a band removably attachable to head retention piece 12, such as that described with reference to center band extensions 36 or 40, described elsewhere.

Back band 18, in one embodiment, is not integrally formed with head retention piece 12 but is securable to side bands 14 and centerpiece 16 as described herein. Back band 18 may be implemented with elastic, webbing or other durable fabric. In other embodiments, the back band 18 may consist of Velcro, elastic and/or a D-ring allowing for universal adjustability.

In the embodiment illustrated in FIGS. 1A-C, each of straps 14A-B may have a plurality of connectors 15 comprising either the hook or pile portion of a hook and pile connector. Similarly, each of bands 16A-B may have either the hook or pile portion of a hook and pile connectors 15 extending along the length portions thereof which are sewn together to form slit 17. The back band 18 may be comprised entirely of the file or female portion of a hook and pile connector 15 or may have strap ends affixed thereto either permanently with stitching or removably with a slidable loop 11.

In other embodiments, as illustrated in FIGS. 2A-C, center band 16 may be formed from a single strap having a plurality of locations comprising either the hook or pile portion of a hook and pile connector 15, similar to side bands 14A-B described previously. In such embodiment, band 18 may comprise a fabric member having short side straps attached at ends thereof and multiple locations on either side thereof comprising either the hook or pile portion of a hook and pile connector to facilitate connection to center band 16 and/or side bands 14A-B or Velcro placed on the child car seat.

In other embodiments, as illustrated in FIGS. 3A-B, the back band 18 may have a pair of female buckle receiving counterparts of buckles 20 at one or both ends thereof for receiving the projection buckle ends of buckles 20 of the side bands 14A-B. The back band 18 may also comprise Velcro which attaches to stick on Velcro placed on the child car seat. Two strips of Automotive grade adhesive Velcro 19 may be adhered to each upper back side of the car seat. The Velcro has a temperature range of −40 to 185 degrees Fahrenheit and therefore resists break down due to the extreme temperatures possible in a car parked outdoors in winter or summer. A loop may be formed at the end of center strap 16 not secured to head retention piece 12 floor for slidably receiving back band 18. Alternatively, back band 18 may have a slidable loop affixed there on an attachable to the free end of center band 16 the Velcro or other connector.

In one embodiment, a version of the BobStop compatible with booster seats uses an adhesively securable pile (female) portion of a Velcro connector while the convertible car seat version uses hook (male) adhesive Velcro.

In one embodiment, pressure releasing side clips may be used to secure the side bands 14 and back band together so that they may be released in the event of a possible crash impact to allow the child's head to move freely to dissipate any impact momentum.

In practice, the accessory device 10 is securable about the car seat in the following manner. First, the side bands 14 are extended around the sides of the car seat towards the back side thereof and removably secured to back band 18. Next, the center band 16 is extended around the top of the car seat towards the back side thereof and removably secured to back band 18.

The Bobstop can be mounted on most convertible car seats and booster seats. On convertible seats, a longer Velcro strip may be utilized to allow the BobStop to be adjusted upward as the child grows taller. The accessory retention device described herein may be packaged with other items, such as a small pillow to provide additional comfort/amusement to the child.

According to another aspect of the disclosure, any of the embodiments of accessory device 10 disclosed herein may be designed to facilitate automatic disengagement from the wearer in the event of an impact that would cause the child's head to move forward while strapped into a convertible car seat or a booster seat. In one embodiment, the accessory device 10 may be provided with multiple straps, at least one of which has different elasticity characteristics than the other straps, thereby enabling the accessory device to slip off the child's head. More specifically, if the center band 16 alone or in combination with any extension bands attached thereto, connected to the center of the head retention piece 12 is stiffer or less elastic than one or both of side bands 14A-B, in the event of a vehicle impact, as the child's head moves forward, the stiffer less elastic center band 16 will stretch less causing the head retention piece 12 to be pulled off and over the top of the child's head as the child's head moves forward.

Referring to FIG. 4A, in embodiments, an accessory device 10 comprises a head retention piece 12 having a pair of side bands 14A-B secured thereto and extending in opposite directions outwardly therefrom along a common axis 13, and a center band 36 extending outwardly from head retention piece 12 in a direction normal to the axis 13, substantially similar to those described with reference to FIGS. 1A, 2A and 3A described herein. Side bands 14A-B may be implemented with elastic, webbing or other durable fabric. In an embodiment, side bands 14A-B comprise an elastic material and are attached at one end to head retention piece 12. The unattached ends of side bands 14A-B may have connectors 28 sewn thereto. Connectors 28 may be implemented with either one of the pile (female) portion or the hook (male) securable portion of a Velcro connector. Connectors 28 are securable to connectors 34 of back band 30 of FIG. 5A. Connector 25 (illustrated in phantom may be implemented similar to connectors 28 and is securable to connector 35 of center band extension 36 of FIG. 5B. One or both of connectors 37 of center band extension 36 or connectable to back band 30 via connector 34 (illustrated in phantom).

FIG. 5A illustrates conceptually a back band 30 comprising a band 32 and at least one connector 34. Band 32 may be implemented with elastic, webbing or other durable fabric. Connector 34 may be implemented to compliment the implementation of connectors 28. In one embodiment, band 32 may comprise elastic and connector 34 may comprise either one of the pile (female) portion or the hook (male) securable portion of a Velcro connector which complements connectors 28.

FIG. 5B illustrates conceptually a center band extension 36 comprising a band 35 and connectors 37 and 38. Band 35 may be implemented with elastic, webbing or other durable fabric. Connectors 37 and 38 may be implemented to compliment the implementation of connectors 34 of back band 30. In one embodiment, band 35 may comprise elastic and connectors 37 and 38 may comprise either one of the pile (female) portion or the hook (male) portion of a Velcro connector which complements connectors 34. In such implementation, connectors 37 and 38 are fairly rigid and are attached to band 35. Accordingly, even if band 35 comprises elastic, the section of band 35 to which either of connectors 37 or 38 is attached will not stretch appreciably in comparison to the remainder of band 35. Multiple connectors 38 attached to band 35 will further reduce the elastic characteristics of band, thereby adding more stiffness or rigidity overall to the center band extension 36. The extended length of connector 37 will further reduce the elasticity of band 35. One end of center band extension 36 has a connector 35 attached thereto which may be sized and shaped for being secured to connector 25 of head retention piece 12.

In one embodiment, center band extension 36 may be comprised of a pair of bands secured together similar to band 16 of FIG. 1 in which the center band extension may comprise a pair of bands secured to each other, typically with stitching, at atleast one, and possibly at plural locations along respective lengths thereof so that adjacent locations at which the pair of bands are secured together define at least one slit allowing passage of an object, such as a car seat tether or safety belt, through the center band extension 36. Similar to center band 16, both bands may have connectors, e.g. connectors 37 and 38, extending over a portion of their respective lengths to facilitate attachment of center band extension 36 to back band 30.

Referring to FIG. 4B, in embodiments, an accessory device 10 comprises a head retention piece 12 having a pair of side bands 14A-B. Connector 25 (illustrated in phantom) may be implemented similar to connectors 28 and is securable to connector 47 of the center band extension 40 of FIG. 6A. One of connectors 44 of center band extension 40 is securable to back band 45 via a connector 48 (illustrated in phantom).

FIG. 6A illustrates conceptually a center band extension 40 comprising a band 42 and at least one connector 44. Band 42 may be implemented with elastic, webbing or other durable fabric. Connectors 44 may be implemented to compliment the implementation of connectors 48 of back band 45. In one embodiment, band 42 may comprise elastic and connectors 44 may comprise either one of the pile (female) portion or a hook (male) portion of a Velcro connector which complements connectors 48. In such implementation, connectors 48 are fairly rigid and are attached to band 42. Accordingly even if band 42 comprise elastic, the section of band 42 to which a connector 48 is attached will not stretch appreciably in comparison to the remainder of band 42. Multiple connectors 48 attached to band 42 will further reduce the elastic characteristics of band 42, thereby adding more stiffness or rigidity overall to the center band extension 40. One end of center band extension 40 has a connector 48 attached thereto which may be sized and shaped for being secured to connector 25 of head retention piece 12.

FIG. 6B illustrates conceptually a back band 45 comprising a band 46 and at least one connector 48. Band 45 may be implemented with elastic, webbing or other durable fabric. Connectors 48 may be implemented to compliment the implementation of connectors 28. In one embodiment, band 45 may comprise elastic and connectors 48 may comprise either one of an adhesively securable pile (female) portion of a Velcro connector or a hook (male) adhesive portion of a Velcro connector which complements connectors 28.

Again, because side bands 14 A-B have greater elasticity than the composite elasticity of center band extensions 36 or 40, in the event of a vehicle impact, as the child's head moves forward, the stiffer less elastic center band extension will stretch less causing the head retention piece 12 to slide over the top of the child's head as the child's head moves forward in response to a sudden change in momentum.

Although the embodiment described herein in uses one or multiple sections of either of the pile (female) portion or a hook (male) adhesive portion of a Velcro connector attached to center band extensions 36 or 40, other mechanisms may be utilized to reduce the elastic characteristics of the center band extension.

In one embodiment, the center band extensions 36 or 40 may comprise webbing or fabric which has little or no elastic characteristics, such as the fabric from which automobile safety belts are made, while side bands side bands 14A-B may comprise elastic or a material having greater elastic characteristics than the material from which the center band extension is made.

In other embodiments, the combined elasticity of side bands 14A-B and either of back bands 30 or 45, when coupled together about a car seat, exceeds that of either of center band extensions 36 or 40, when attached intermediate head retention piece 12 and either of back bands 30 or 45. This is due, in part, because side bands 14A-B are connected to either of back bands 30 or 45 along a substantially common axis, and therefore will stretch to the limit of their combined elasticity when pulled upon by the weight of a child's head in the event of a shift in momentum. Conversely, either of center band extensions 36 or 40, attached at a right angle to either of back bands 30 or 45 and will stretch only to their limits of elasticity along a much shorter axis normal to the long axis of bands 30 or 45. In this manner, the combined interactions of back bands 30 or 45 with side bands 14 A-B and center band extensions 36 or 40 causes the difference in elasticity forces, again, causing head retention piece 12 to slide over the top of the child's head as the child's head moves forward in response to a sudden change in momentum.

In the contemplated embodiments, any of the side bands, back band, or center band may be of variable length with adjustment mechanisms for selectively adjusting the appropriate length thereof for maximum child comfort. In addition, the head retention piece, side bands, back band and center band may be securable to each other using any known mechanism such as buckles, clips, snaps, loops, hook and pile connectors such as Velcro, sewing etc. In one embodiment, the head retention piece, side and back bands may comprise a single continuous piece of material having a selectively adjustable length. In addition, any known means may be used to secure either the back band or side bands of the accessory device to the child car seat or booster seat including, but not limited to, hook and pile type connectors, snaps, buttons, buckles, etc.

It will be obvious to those recently skilled in the art that modifications to the apparatus and process disclosed here in may occur, including substitution of various component values or nodes of connection, without parting from the true spirit and scope of the disclosure.

What is claimed is:

1. A head restraint apparatus for use with car seats comprising:
    a head retention piece;
    a pair of side bands extending outward from the head retention piece in opposite directions along a common axis; and
    a center band extending outward from the head retention piece in a direction substantially normal to the common axis,
    wherein the side bands and center band are securable about a car seat, and
    wherein the center band is less elastic than the side bands and comprises a pair of bands secured at first ends thereof to the head retention piece and to each other at plural locations along respective lengths thereof.

2. The head restraint apparatus of claim 1 further comprising:
    a back band securable to one of the side bands and center band.

3. The head restraint apparatus of claim 2 wherein the back band is securable to the side bands and center band.

4. The head restraint apparatus of claim 1 wherein adjacent of the plural locations at which the pair of bands are secured together define at least one slit allowing passage of an object through the center band.

5. The head restraint apparatus of claim 2 the back band is securable to the side bands by one of buckles or hook and pile connectors.

6. The head restraint apparatus of claim 2 wherein the back band is securable to the center band by one of a buckle or hook and pile connector.

7. The head restraint apparatus of claim 2 wherein the center band includes a loop formed in an end thereof not attached to the head retention piece and wherein the back band extends through the loop.

8. The head restraint apparatus of claim 7 wherein the back band comprises one of a hook and pile connector attached thereto for securing to the other of the hook and pile connector attachable to a car seat.

9. The head restraint apparatus of claim 7 wherein the pair of side bands each comprise one of a hook and pile connector attached thereto for securing to the other of the hook and pile connector attachable to a car seat.

10. A kit comprising:
    a head restraint apparatus for use with a seat comprising a head retention piece having a plurality of bands extending outward therefrom, at least one of the plurality of bands having a lower level of elasticity than others of the plurality of bands, wherein the plurality of bands comprises a pair of side bands extending outward from the head retention piece in opposite directions along a common axis and another of the plurality of bands comprises a center band extending outward from the head retention piece in a direction substantially normal to the common axis; and
    one or more securing means for securing any of the plurality of bands about the seat.

11. The kit of claim 10 further comprising a back band securable to the side bands by one of buckles or hook and pile connectors.

12. The kit of claim 11 further comprising a back band securable to the center band by one of a buckle or hook and pile connector.

13. The kit of claim 12 wherein the center band includes a loop formed in an end thereof not attached to the head retention piece and wherein the back band extends through the loop.

14. The kit of claim 10 wherein the side bands are attached to the head retention piece with stitching.

15. The kit of claim 10 wherein the side bands are attached to the head retention piece with buckles.

* * * * *